Nov. 1, 1927.

F. HUNYADY 1,647,294

VEHICLE BRAKING SYSTEM

Filed Jan. 19, 1927

Inventor

Frank Hunyady.

By Barthel & Barthel

Attorneys

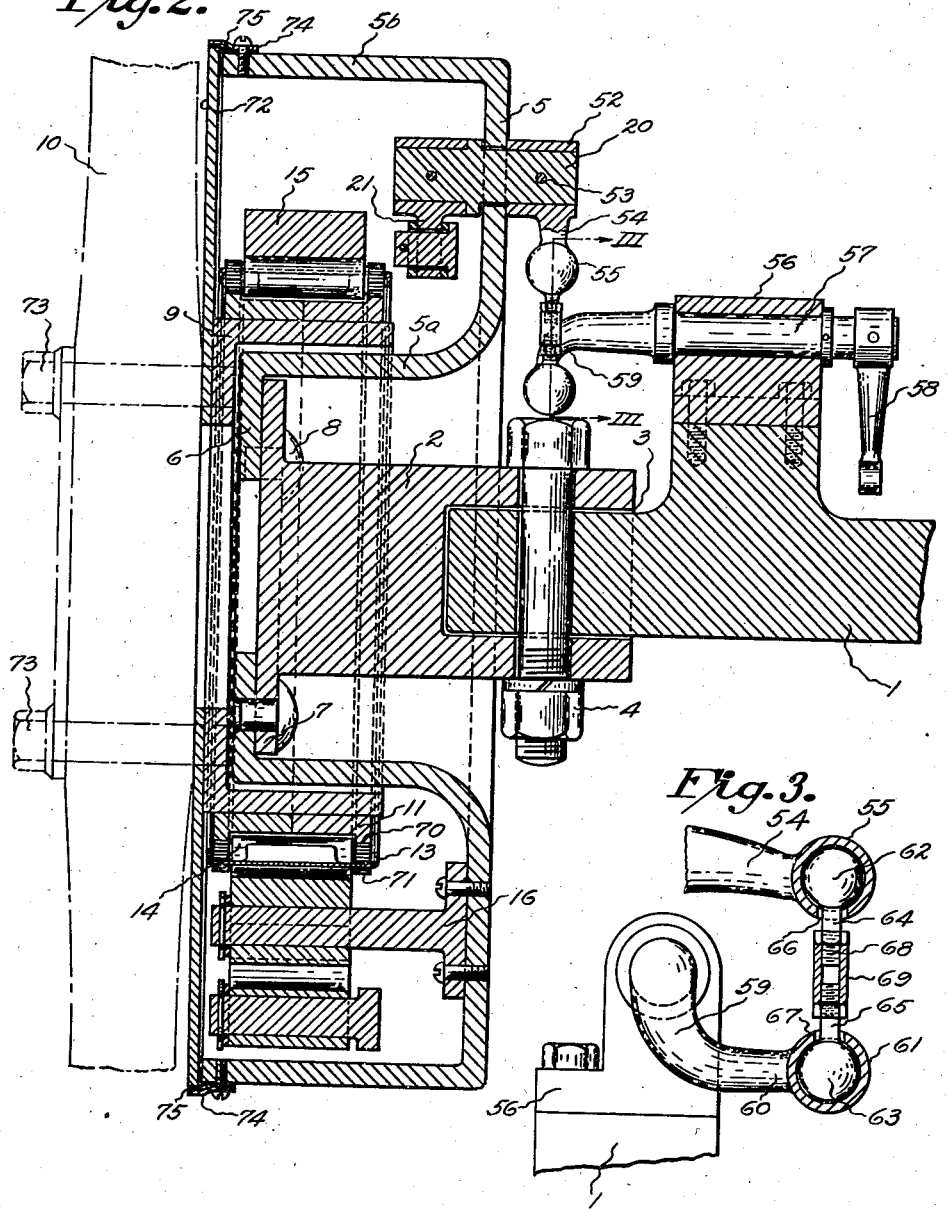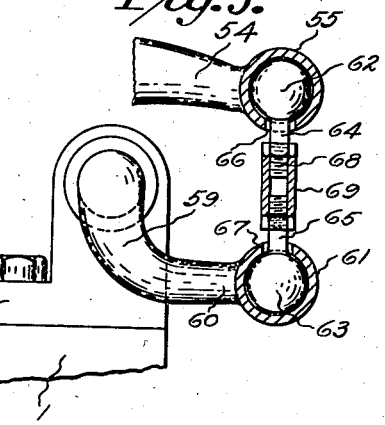

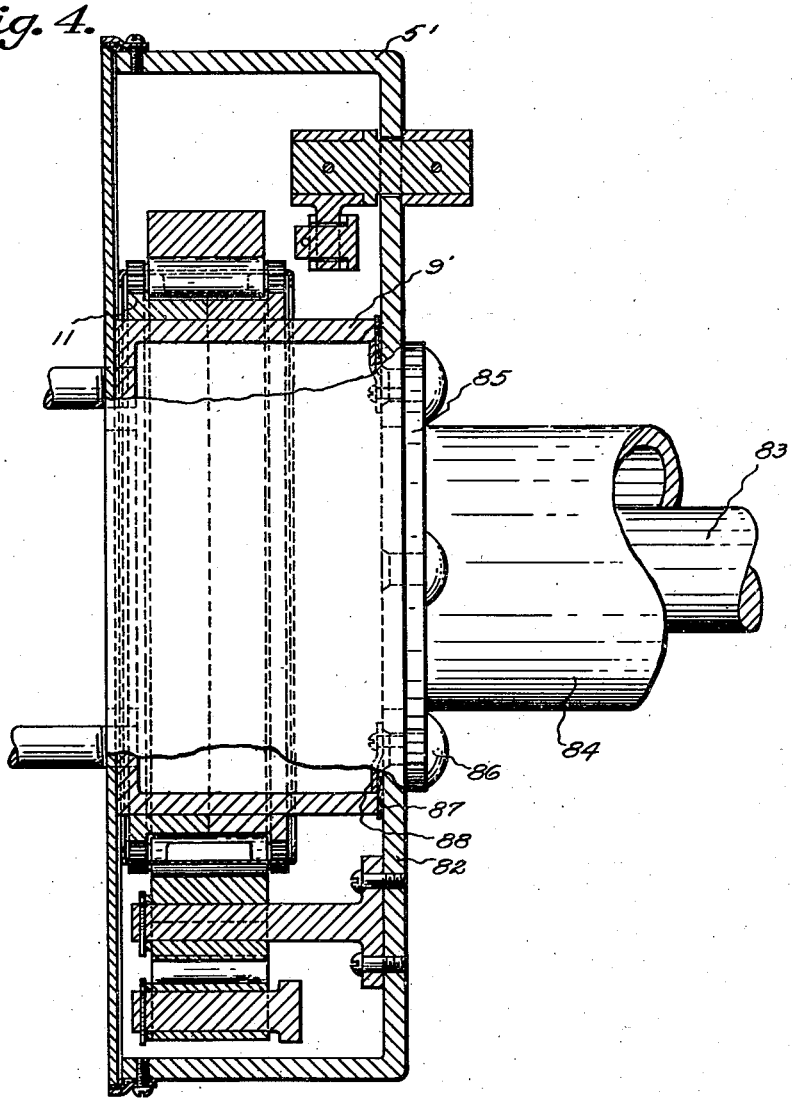

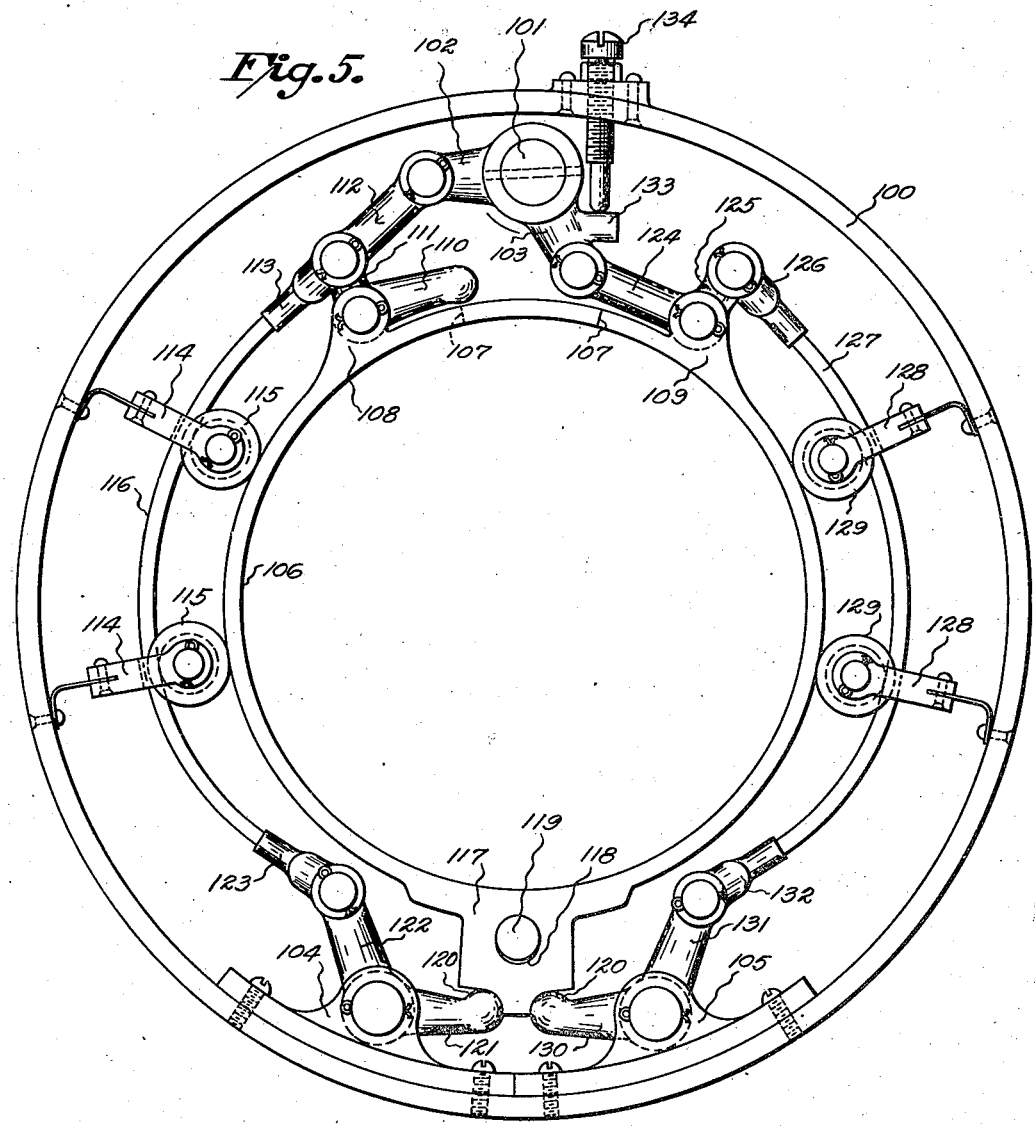

Patented Nov. 1, 1927.

1,647,294

UNITED STATES PATENT OFFICE.

FRANK HUNYADY, OF DETROIT, MICHIGAN.

VEHICLE-BRAKING SYSTEM.

Application filed January 19, 1927. Serial No. 162,002.

The present invention pertains to a novel braking system designed particularly for application to automobiles and other wheeled vehicles, but also useful in any instance where a rotary member is to be stopped.

The principal object of the invention is to provide a brake construction which dispenses with the usual brake band and the objections attendant thereto. One of the most apparent advantages of eliminating the brake band is that the usual wear and periodic replacement of this member is entirely withdrawn from consideration, while in the present invention the engaging or locking parts of the mechanism are of a permanent character so that replacement thereof does not become necessary during the life of the machine.

In the accomplishment of this object the device is constructed in the form of a fixed drum secured to a stationary axle and an inner drum rotatably mounted within the fixed drum and adapted for connection to the rotary member. Clamping or gripping mechanism is placed around the inner drum and is adapted to be pressed thereagainst by actuation of the brake operating member. The gripping mechanism consists of a permanent member such as a split ring or a series of interconnected jaws which when pressed against the inner drum, firmly hold the same against rotation. Between the rotatable drum and the gripping jaws is provided a series of rollers which in fact take the pressure of the jaws and transmit it to the fixed drum. In order to prevent rolling after the gripping mechanism has been tightened, the rollers are knurled or roughened at their ends for engagement with correspondingly roughened parts associated with the drum. Normally, however, when the gripping member is in released position, the rollers provide a very efficient bearing between the rotatable drum and the gripping elements.

A further advantage resulting from this construction is that the rotary member for which the brake is provided may roll, when the power has been disconnected therefrom, without wearing the brakes, since the elements of the latter are of a permanent construction as already indicated.

Another important feature of the invention, particularly advantageous in connection with the front wheels of motor vehicles, is that the brakes may be applied to these wheels regardless of the angle at which the wheels may be disposed with reference to the front axle. When the bands of ordinary brakes are operated upon while the front wheels are at an angle to the axis, a lateral pull will be effected on the bands, having no effective braking action on the wheels and merely locking them in their angular position. The present invention overcomes these difficulties by means of a novel connection between the brake parts and the brake control gear. The mechanism within the brake drum for effecting the braking action may be conceived as beginning at a spindle rotatably mounted in the drum and joined in the mechanism. Outside the drum, the spindle carries an arm having a universal connection with the final element in the brake control gear. The final element is substantially parallel to the axle carrying the wheel, but the universal connection between this element and the gear mechanism is equally effective at all times, regardless of the angle at which the front wheel may lie with respect to the axle. It will be evident that by means of this universal connection the above mentioned lateral pull on the usual brake band and consequent locking of the wheel, are avoided.

The invention is fully disclosed in the following description and in the accompanying drawings, in which—

Fig. 2 is a section on the line 2—2 of Figure 1;

Fig. 3 is a section partly in elevation, on the line 3—3 of Figure 2;

Fig. 4 is a section partly in elevation, corresponding to Figure 2 of the construction for the rear wheels, and Fig. 5 is an elevation, corresponding to Figure 1, of a simplified embodiment.

Reference to these views will now be made by use of like characters which are employed to designate corresponding parts throughout.

Figure 1:
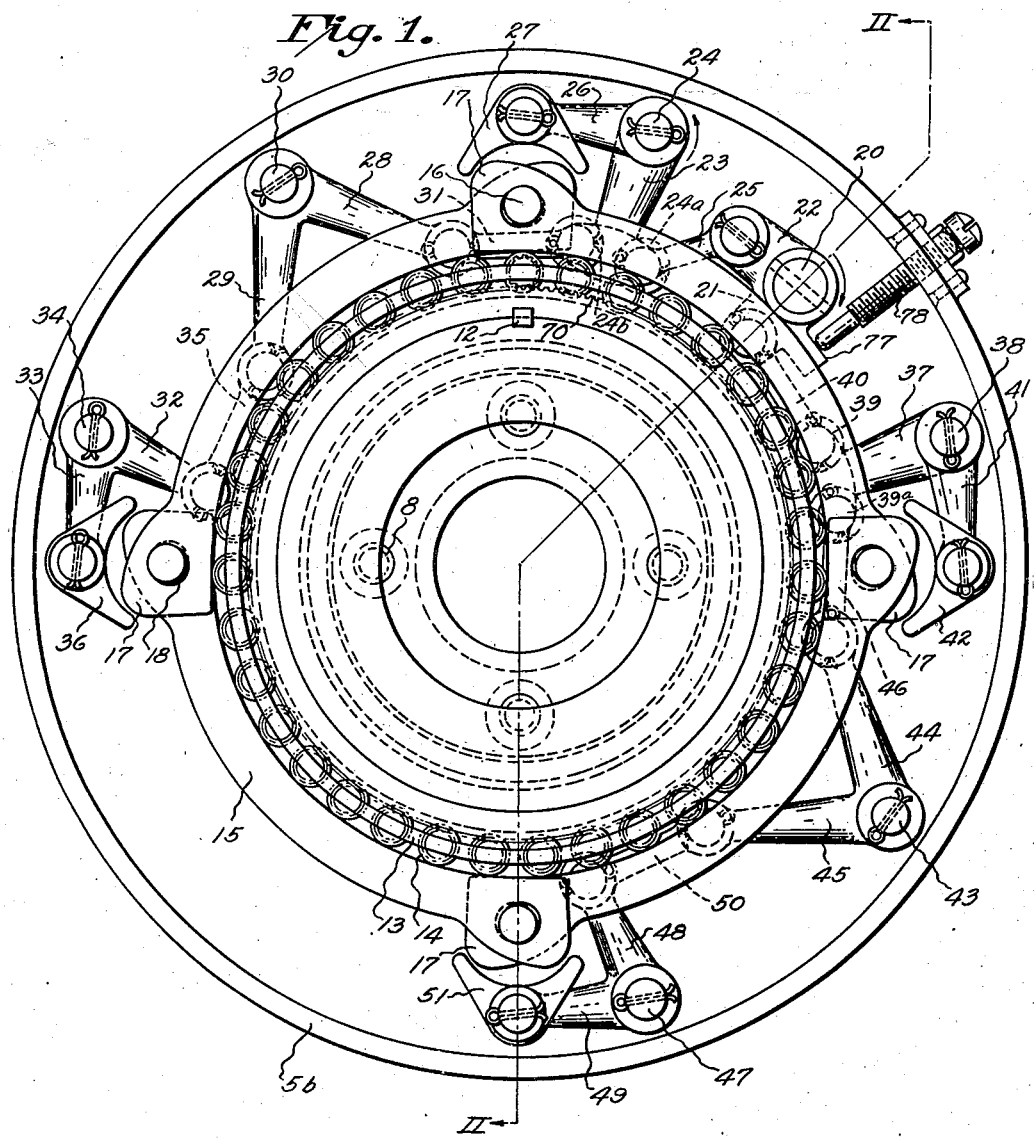
Figure 1 is an elevation of a device constructed according to the invention, the cover plate being removed.

The embodiment of the invention shown in Figures 1, 2 and 3 is applied to the ends of the front axle 1. The construction is identical at each end, and the description thereof with respect to one end is therefore deemed sufficient.

An inner core 2 is formed with a socket 3 which accommodates the extremity of the axle, and the two parts are joined by a bolt and nut device 4 passing therethrough. The core is surrounded by a double walled drum 5 having a flange 6 extending inwardly from its inner wall 5$^a$ and secured to a flange 7 at the remaining end of the member 2 by means of suitable pins 8. The inner wall 5$^a$ of the drum 5 is surrounded by an inner drum 9 of right angular cross-section held at a slight spacing by its attachment to the adjacent front wheel 10 in a manner subsequently to be described. The attachment however is not made until other parts have been assembled between the inner drum 9 and the outer wall 5$^b$ of the drum 5. The inner drum 9 is engaged by a surrounding ring 11 fixed thereto by a key 12, as clearly shown in Figure 1. Further, the member 9 is surrounded by a roller casing 13 containing rollers 14 and suitably slotted at intervals in its curved wall to permit penetration of the rollers therethrough as may be seen in Figures 1 and 2.

The series of rollers is surrounded and adapted for engagement by a closed system of arcuate jaws 15 joined at their ends by pins 16 fixed to the inner wall of the drum 5. The ends of the members 15 are formed with upstanding shoulders 17 for a purpose later to be pointed out, and the apertures 18 for accommodating the pins 16 are slightly larger than the latter to permit play so that the jaws may be adjusted with reference to the rollers by mechanism also comprised in the invention.

As already indicated, a means is provided for pressing the curved jaws 15 against the rollers to create a binding effect between the drum 5 fixed with respect to the axle and the inner drum 9 rotatable with the wheel 10 for the purpose of braking the wheel. The mechanism for actuating the pressure jaws in this manner may be conceived as commencing at a spindle 20 journaled in the inner wall of the drum 5 as shown in Figures 1 and 2. To the spindle and within the drum 5 is secured a bell crank lever comprising a leg 21 lying substantially radially of the drum, and another leg 22 perpendicular to the first leg. Adjacent the bell crank lever, a radially disposed arm 23 is rotatably mounted on a pin 24. This arm is also mounted in a radial direction and provided at its outer end with a double knuckle having one element 24$^a$ joined to the free end of the leg 22 by a link 25. To the pivot end of the arm 23 is secured a perpendicular finger 26 carrying at its free end a loosely mounted pressure head 27 of inverted V-shape and normally disposed over the shoulders 17 at one of the pins 16.

At the other side of the pin 16 just mentioned, a bell crank lever having arms and legs 28 and 29 is pivotally mounted on a pin 30 secured to the drum 5. The free end of the leg 28 is joined by a link 31 to the remaining element 24$^b$ of the double knuckle formed with the arm 23. Adjacent the bell crank lever 28, 29 another bell crank lever 32, 33 is pivotally mounted at its vertex on a pin 34 fixed to the drum 5. The inwardly directed leg 32 has its free end joined to the leg 29 by a link 35, and the free end of the remaining link 33 carries a pressure head 36 similar to the member 27 adapted to engage the shoulders 17 therebeneath.

Continuing from the spindle 20 in the other direction, there is provided an arm 37 pivotally mounted on a pin 38 loose with respect to the drum 5. The lower end of the arm is formed with a double knuckle having one element 39 joined by a link 40 to the member 21. To the pin 38 is keyed a finger 41, the free end of which carries a pivotally mounted pressure head 42 adapted for engagement with the shoulders 17 therebeneath. Next in sequence is a pin 43 having pivoted thereon a bell crank lever comprising arms 44 and 45. The free end of the arm 44 is joined by a link 46 to the remaining element 39$^a$ of the double knuckle last mentioned. Finally there is provided another bell crank lever pivotally mounted on a pin 47 fixed to the drum 5 and comprising legs 48 and 49. The free end of the leg 48 is joined to the free end of the leg 45 by a link 50, and the free end of the leg 49 carries a pivoted pressure head 51 positioned in the same manner as the other members of like construction. It will be understood that the number of pressure jaws 15 may be increased or decreased to any desired extent, in which case there will be provided a pressure head for each joint and also appropriate gearing for actuating these heads in the manner presently to be described.

With more particular reference now to Figures 2 and 3, the part of the spindle 20 disposed outside of the drum 5 is surrounded by a collar 52 fixed by a pin 53. The object of the collar is merely to retain depending arm 54 formed with a socket 55.

Upon the axle 1, near the end thereof, is secured a bearing block 56 accommodating a shaft 57. To the inner end of the shaft is secured an arm 58 which may be joined by suitable link or connecting rod to the usual brake axle employed in four-wheel brake construction, and thence to the foot brake pedal near the driver's seat. The other end of the shaft is bent downwardly as at 59, then laterally as at 60, and is finally formed with a socket 61. The object of the curvature described is merely to bring the sockets 55 and 61 into vertical alignment. The sockets 55 and 61 contain balls 62 and 63 universally rotatable therein and formed with stems 64 and 65 respectively passed through apertures 66 and 67 in the sockets. The stems are in alignment and are threaded as at 68. The stems are joined by a sleeve 69 threaded thereon, and by means of this connection, the distance between the balls 62 and 63 may be adjusted to suit various conditions.

The ring 11 has short roughened flanges 70 at its edges arranged to engage the finely knurled ends 71 of the rollers 14. The assembly is completed by cover plates 72 provided at the open face of the drum 5 and fixed to the wheel 10 by bolts 73 passing through the latter and also into the inner drum 9 for the rotatable mounting of this drum in the manner already indicated. A dust-proof joint between the plates 72 and the wall $5^b$ of the drum 5 is obtained by securing the ring 74 to the edge of the wall $5^b$ in such a manner as to overlap the edge of the plate 72, and inserting a felt packing 75 beneath the ring.

In the operation of the device, the usual brake shaft common in four-wheel brake systems is caused to turn by actuation of a foot pedal, and as a consequence of this movement the shaft 57 is turned owing to its connection through the arm 58 and other linkage to the brake shaft. The arm 60 is turned, moving the spindle 20 likewise, in the direction of the arrow in Figure 1. The entire linkage placed around the gripping jaws 15 is set in motion in such a manner as to bring the pressure heads 27 down upon the shoulders 17. This mode of operation may readily be ascertained by following the various parts of the linkage in their movement consequent to the above mentioned turn of the spindle 20. The pressure which the heads 27 effect upon the shoulders 17 depends upon the pressure applied to the foot brake. A gripping movement of the jaws 15 upon the rollers 14 under this pressure, is possible through the loose connections between the pressure jaws at the aperture 18 which loosely receive the connecting pins 16.

An important feature of the invention is that the brakes may be applied, regardless of the angle of the wheels to the axis of the vehicle. Ordinarily when the wheels are at an angle to this axis, a pull on the brake band is effected in a lateral direction without binding action on the brake drum. In the present invention however, the universal joint between the arm 59 and the member 54 causes in all positions a simple rotation of the spindle 20 which is transmitted to the pressure heads 17 and jaws 15 in the manner already described in detail.

For the purpose of determining the maximum spacing of the heads 27 with respect to the shoulders 17, the member 21 is provided with a lateral flange 77 engageable by a screw 78 threaded through the outer drum $5^b$ and accessible from the outside. The set screw may thus be adjusted to compensate for wear on the brake shoes and between the parts 27 and 17.

This form of brake, modified slightly for the rear end of the automobile, is shown in Figure 4. The drum 9' is engaged by the roughened ring 11, and the remaining parts within the outer drum 5' are similar to those described in connection with Figures 1 and 2.

The outer drum, instead of being bent inwardly to form an inner wall, is merely formed with a straight flat back 82. The rear axle 83 is surrounded by a housing 84 having a flange 85 at its rear end, and this flange is tied to the back 82 by pins or rivets 86. In order to accommodate the rotary movement of the drum 9' with respect to the stationary back 82, the lateral member is engaged at its inner face by a packing ring 87 which is also engaged by the adjacent edge of the drum 9'. The packing is held in place by a ring clip 88 secured to the back 82.

Figure 5 illustrates a simplified and cheaper embodiment of the invention. In this construction the outer stationary drum 100 is penetrated by a rotatable spindle 101 joined to the brake axle in the same manner as the member 20 shown in Figures 1, 2 and 3. The spindle 101 carries a bell crank lever comprising arms 102, 103 extending to opposite sides thereof. At a region diametrically opposite the spindle 101, the drum 100 has a pair of lugs 104 and 105 provided for the pivotal mounting of additional bell crank levers. Since the construction is the same at both sides, only one of these levers and its associated parts need be described.

The gripping member corresponding to jaws 15 is an expansible metal ring 106 which is split by an oblique slot 107 disclosed directly beneath the spindle 101. Lugs 108 and 109 are formed on the ring at opposite sides of the slot, and the member 108 serves as a pivotal support for the bell crank lever having an arm 110 bearing on the ring. The other arm 111 is joined to the arm 102 by a link 112 and is extended at the other side of the pivot in the form of a socket 113.

To the inner wall of the drum 100 is secured a pair of brackets 114 mounted in spaced relation between the members 104 and 108. The brackets carry pulleys 115 bearing on the ring 106 and trained by a wire loop or cable 116. One end of the cable is received in the socket member 113. Between the lugs 104 and 105, the ring 106 is formed with a head 117 having an aperture 118 in which is loosely received a pin 119 fixed to the drum 100. The outer end of the head has grooves 120. To the lug 104 is pivoted a bell crank lever having one of its arms 121 received in one of the grooves 120, while the other arm 122 is pivotally connected to a socket member 123, retaining the remaining end of the cable 116.

A similar construction is provided at the other side of the ring 106. The free end of the leg 103 is joined to one leg of a bell crank lever 124 pivoted to lug 109. The remaining leg 125 of the bell crank lever is pivoted to a socket member 126 receiving a wire loop or cable 127. At this side of the ring the drum 100 supports a pair of spaced brackets 128 between the lugs 105 and 109. The brackets support pulleys 129 engaging the ring 106 and trained by the member 127. Finally, the lug 106 has pivotally connected thereto a bell crank lever having one of its arms 130 seated in the remaining groove 120 and its other arm 131 pivotally joined to a socket member 132 receiving the remaining end of the member 127. The engagement of the arms 121 in the grooves 120 provides two or more points at which the ring 106 is held against rotary movement when operated. The parts within the ring 106 have been omitted for clarity of illustration, but may be conceived as similar to the construction already described. In the present case the rollers having knurled ends are directly engageable by the expansible spring 106.

When the spindle 101 is turned in the direction of the arrow through the action of the brake pedal and brake shaft, the member 121 and 130 will be drawn into closer engagement with the head 117 whereby the ring 106 will be pressed against the inner rollers at this area. Also, the member 110 will be pressed against the ring near the slot 107. At the same time the bell crank lever 102, 103 will contract the ring 106 and tighten it against the rollers throughout the entire circular series.

In order to adjust the maximum looseness of the split ring 106, the member 103 is provided with a finger 133 engageable by a set screw 134 through the outer wall of the drum 100.

What I claim is:

1. A device of the character described comprising a fixed drum, a rotatable drum mounted therein, pressure jaws carried by the outside drum and surrounding the inner drum, rollers interposed between said jaws and said inner drum and adapted for engagement by said jaws, said jaws being pivotally connected at their ends to form an enclosure around said rollers, shoulders standing out from the ends of said jaws, a linkage applied over said rollers, and pressure heads carried by said linkage and adapted for engagement with said shoulders.

2. A device of the character described comprising a fixed drum, a rotatable drum mounted therein, pressure jaws carried by the outside drum and surrounding the inner drum, rollers interposed between said jaws and said inner drum and adapted for engagement by said jaws, said jaws being pivotally connected at their ends to form an enclosure around said rollers, shoulders standing out from the ends of said jaws, a linkage applied over said rollers, pressure heads carried by said linkage and adapted for engagement with said shoulders, and an adjustable stop device mounted in said outer drum and adapted for engagement by said linkage for limiting the latter in its movement in one direction.

3. A device of the character described comprising a fixed drum, a rotatable drum mounted therein, pressure mechanism carried by the outside drum and surrounding the inner drum, rollers interposed between said mechanism and said inner drum and adapted for engagement by said mechanism, means for applying said mechanism to said rollers, and a roughened member secured around said inner drum and engageable by said rollers, said rollers being also roughened at the areas of contact with said last named member.

4. A device of the character described comprising a fixed drum, a rotatable drum mounted therein, pressure jaws carried by the outside drum and surrounding the inner drum, rollers interposed between said jaws and said inner drum and adapted for engagement by said jaws, means for applying said jaws to said rollers, and a roughened member secured around said inner drum and engageable by said rollers, said rollers being also roughened at the areas of contact with said last named member.

5. In combination with an axle, a brake drum swiveled thereon, a rotatable drum mounted within the fixed drum and adapted for attachment to a rotary member, mechanism within the fixed drum for arresting movement of the rotatable drum, an operating shaft journaled upon said axle, and a universal joint between said shaft and mechanism.

6. In combination with an axle, a brake drum swiveled thereon, a rotatable drum mounted within the fixed drum and adapted for attachment to a rotary member, mechanism within the fixed drum for arresting movement of the rotatable drum, a spindle rotatably mounted in said fixed drum and connected to said mechanism, an arm extending from said spindle, an operating shaft journaled upon said axle, and a universal joint between said operating shaft and said arm.

7. In combination with an axle, a brake drum swiveled thereon, a rotatable drum mounted within the fixed drum and adapted for attachment to a rotary member, mechanism within the fixed drum for arresting movement of the rotatable drum, an operating shaft journaled upon said axle, sockets formed at the ends of said arm and shaft, balls mounted in said sockets and adapted to turn therein, and connecting means between said balls.

8. In combination with an axle, a brake drum swiveled thereon, a rotatable drum mounted within the fixed drum and adapted for attachment to a rotary member, mechanism within the fixed drum for arresting movement of the rotatable drum, an operating shaft journaled upon said axle, sockets formed at the ends of said arm and shaft, balls mounted in said sockets and adapted to turn therein, connecting means between said balls, threaded stems extending from said balls and mounted in alignment with each other, and a sleeve threaded on said stems, thereby joining them in an adjustable manner.

In testimony whereof I affix my signature.

FRANK HUNYADY.